United States Patent [19]

Taylor et al.

[11] Patent Number: 4,753,336

[45] Date of Patent: Jun. 28, 1988

[54] PACKAGING MACHINE

[76] Inventors: Alfred A. Taylor; John P. North, both of 34 Lee St., Condell Park, New South Wales 2200, Australia

[21] Appl. No.: 918,397

[22] Filed: Oct. 14, 1986

[30] Foreign Application Priority Data

Oct. 15, 1985 [AU] Australia .............................. PH2904

[51] Int. Cl.4 ............................................. B65G 47/44
[52] U.S. Cl. .................................... 198/560; 198/343; 198/423; 198/487.1; 198/803.12; 414/30; 414/105; 99/427
[58] Field of Search ................... 198/485.1, 423, 486.1, 198/487.1, 598, 801, 803.12, 343, 560, 562, 644, 425, 732; 99/427, 426; 414/30, 82, 27, 105, 107

[56] References Cited

U.S. PATENT DOCUMENTS

| | | | |
|---|---|---|---|
| 913,285 | 2/1909 | Harbeck | 198/487.1 |
| 3,256,970 | 6/1966 | Fievet | 198/343 |
| 3,267,836 | 8/1966 | Yepis | 99/427 |
| 3,282,393 | 11/1966 | Graves et al. | 198/598 |
| 3,329,255 | 7/1967 | Dulieu | 198/732 |
| 3,351,174 | 11/1967 | Wommelsdorf et al. | 198/343 |
| 3,525,443 | 6/1968 | Pomara | 414/82 X |
| 3,766,851 | 10/1973 | Sirvet et al. | 198/487.1 |

Primary Examiner—Robert J. Spar
Assistant Examiner—Jennifer L. Doyle
Attorney, Agent, or Firm—Ladas & Parry

[57] ABSTRACT

A machine to aid in the packaging of "taco" shells. The machine includes a slide which receives the tacos from an endless conveyor which passes through an oven which cooks the taco shells, the slide passes through the taco shells and delivers the taco shells to a further endless conveyor which has at spaced locations therealong, pins which are successively aligned with the slide so as to recieve a taco shell therefrom.

4 Claims, 6 Drawing Sheets

PACKAGING MACHINE

The present invention relates to apparatus for the packaging of food products and more particularly to the packaging of food products in the form of a shell.

In the manufacture and packaging of "taco" shells the manufactured tacos are collected by hand, and are hand packaged. This known method of packaging "taco" shells is time-consuming, labour-intensive, and therefore expensive.

It is the object of the present invention to overcome or substantially ameliorate the above disadvantages.

There is disclosed herein a machine to aid in the packaging of a hollow food product, said machine comprising a first conveyor means to receive each product delivered thereto, and to position each product in a predetermined orientation, at a predetermined location, a second conveyor means to receive each product from said first conveyor means at said predetermined location, said second conveyor means being adapted to deliver each product to a second predetermined position whereat the products are collected, and wherein said first conveyor means includes a slide which passes through each product so that each product is retained in said predetermined orientation as it is moved along said slide to be delivered to said predetermined position.

There is further disclosed herein a machine to aid in the packaging of a hollow food product, said machine comprising a first conveyor means to receive each product delivered thereto, and to position each product in a predetermined orientation at a predetermined location, a second conveyor means to receive each product from said first conveyor means as said predetermined location, said second conveyor means being adapted to deliver each product to a second predetermined position whereat the products are stacked, and wherein said second conveyor means includes an endless conveyor line restrained so as to pass along a predetermined path, and a plurality of pins attached at spaced locations to said line so as to extend outwardly therefrom, and wherein said predetermined path has a arcued portion with its centre at or about said predetermined position so that the extremeties of said pins are located adjacent said predetermined position to facilitate the transfer of each food product from said first conveyor means to said pins.

A preferred form of the present invention will now be described by way of example with reference to the accompanying drawings, wherein.

Figure 1:
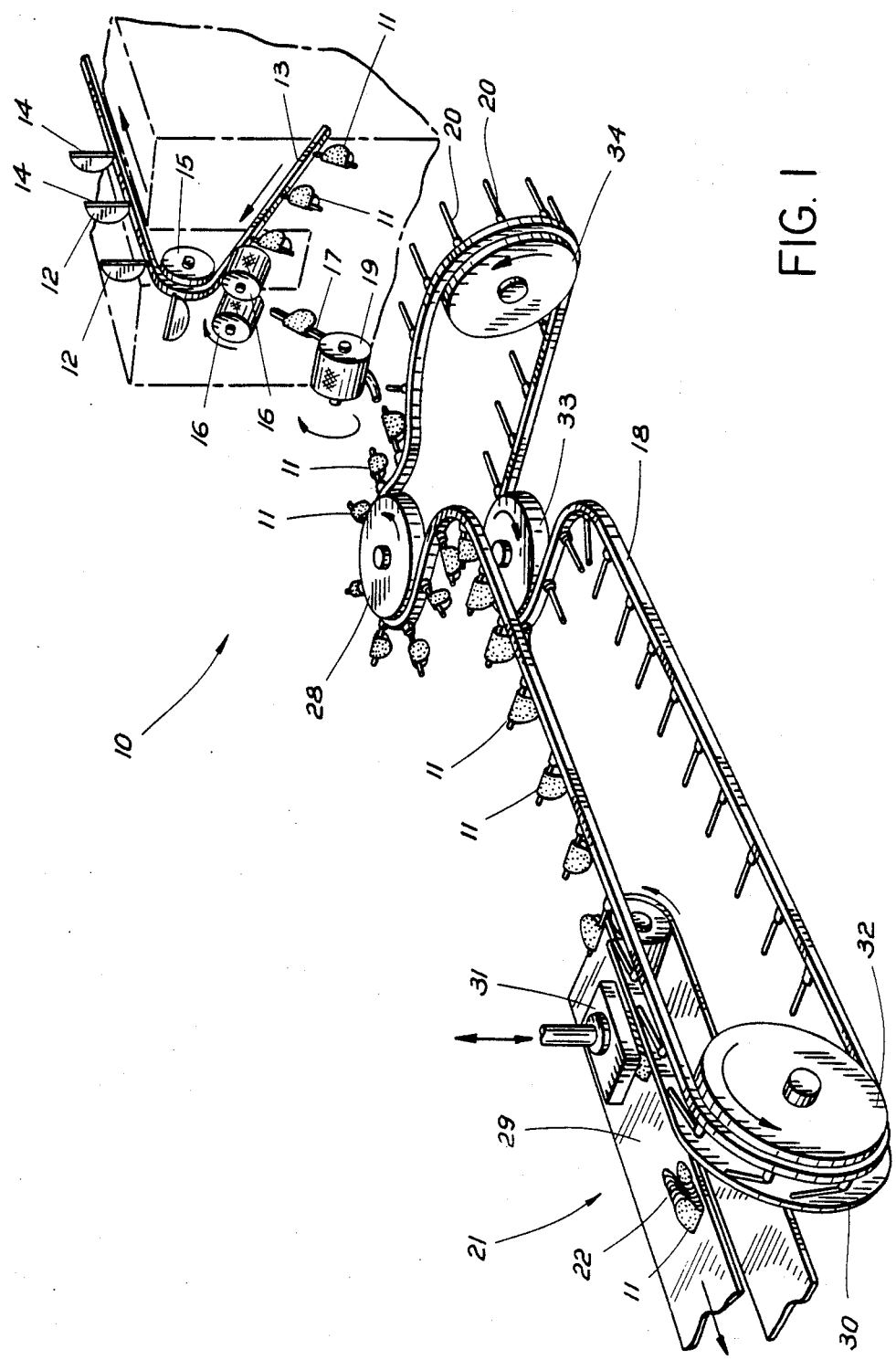
FIG. 1 is a schematic perspective view of a machine to stack "taco" shells.
Figure 2:
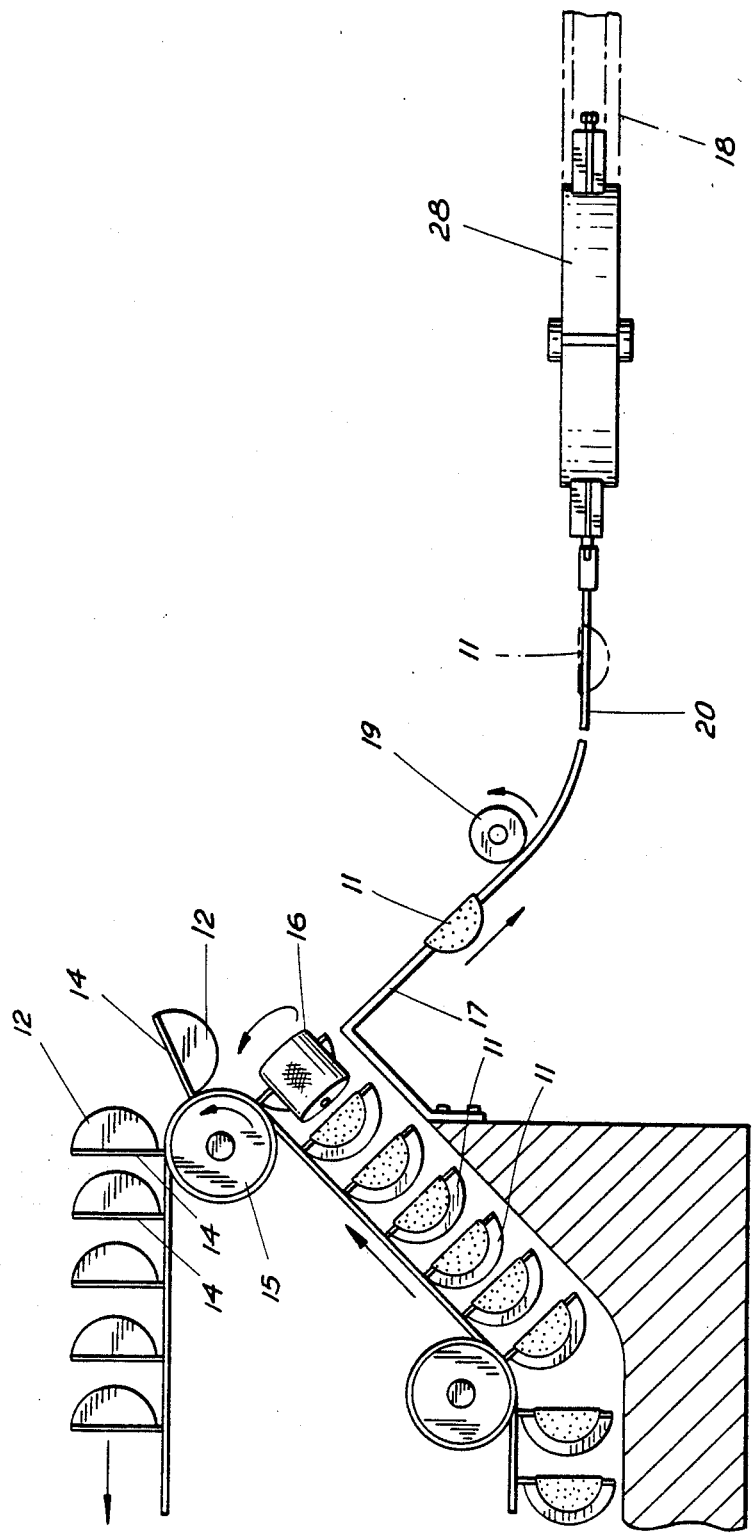
FIG. 2 is a schematic side elevation of a portion of the machine of FIG. 1, to which the "taco" shells are first delivered.

In FIGS. 1 to 6 of the accompanying drawings there is schematically depicted a machine 10 to package "taco" shells 11. Initially the shells 11 are mounted on forming plates 12 attached to a first conveyor line 13 by means of rods 14. The "taco" shells 11 are frictionally retained on the plates 12 so as to be transported thereby. The line 11 proceeds up an incline to pass around a pulley 15. At the top of the incline the shells 11 are engaged by a pair of rollers 16 which propel the shells 11 from their mounting on the plates 12. Located adjacent the rollers 16 is a slide 17 which in this particular embodiment, is in the form of a rod. The slide 17 is shaped so as to fit inside the shells 11 to guide them towards a second conveyor line 18. To propel the shells 11 from the slide 17 there is provided a roller 19. Preferably the rollers 16 and 19 are brush rollers to thereby minimise shell damage.

Figure 5:
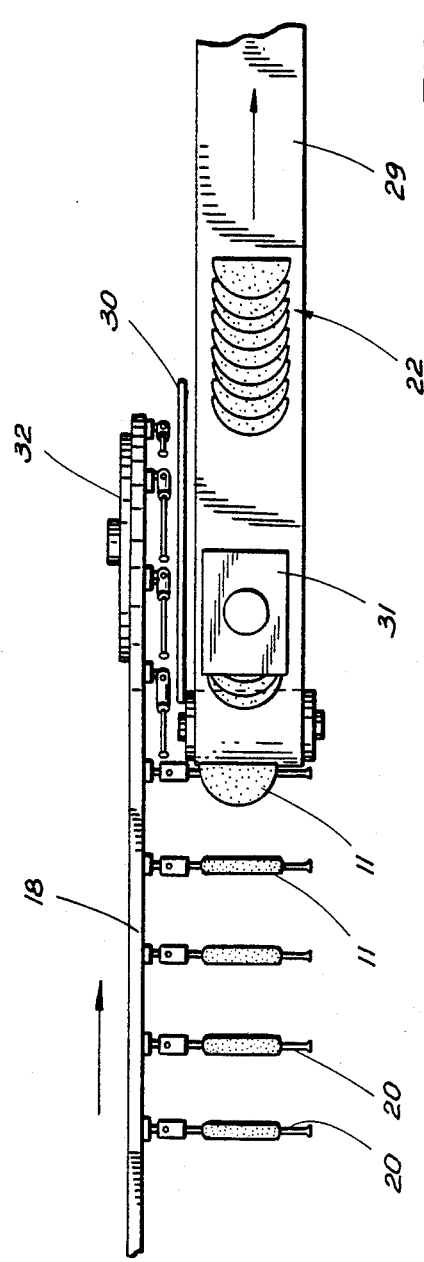
FIG. 5 is a schematic plan view of the portion of FIG. 4.
Figure 6:
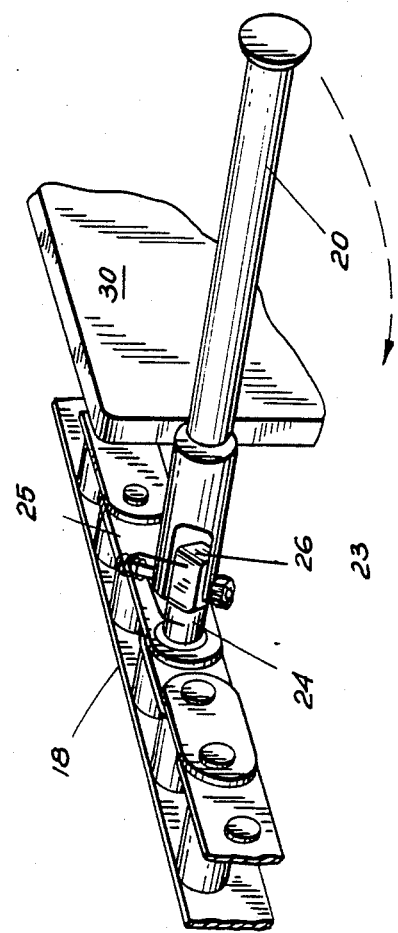
FIG. 6 is a schematic exploded view of the portion of FIG. 4.

The conveyor line 19 is provided with a plurality of equally spaced pins 20, best illustrated in FIGS. 5 and 6. Once the shell is deposited on a pin 20, it is transferred to a stacking and nesting assembly 21. The nesting of the shells 11 is carried out until a set 22 of nested shells 11 is formed.

Now with particular reference to FIGS. 5 and 6 wherein the pins 20 are more fully depicted. Each pin 20 is attached to the line 18 to enable pivotting of the pin 20 about an inclined axis 23. The axis 23 of each pin 20 is inclined to the horizontal as best seen in FIG. 6. Each pin 20 is pivotally attached to a spigot shaft 24 by means of a pin 25, with the pin 20 and shaft 24 cooperating to define by abutment therebetween, the operative generally horizontally extending orientation of the pin 20. Extending between each pin 20 and its associated shaft 24 is a spring 26 biassing the pin 20 to the position depicted in FIG. 6.

The line 18 could be of a chain construction, as illustrated in FIG. 6. With such a chain construction, the chain would be caused to pass about the position 27 by the line 18 being caused to follow a curved path by following a guide.

Figure 3:
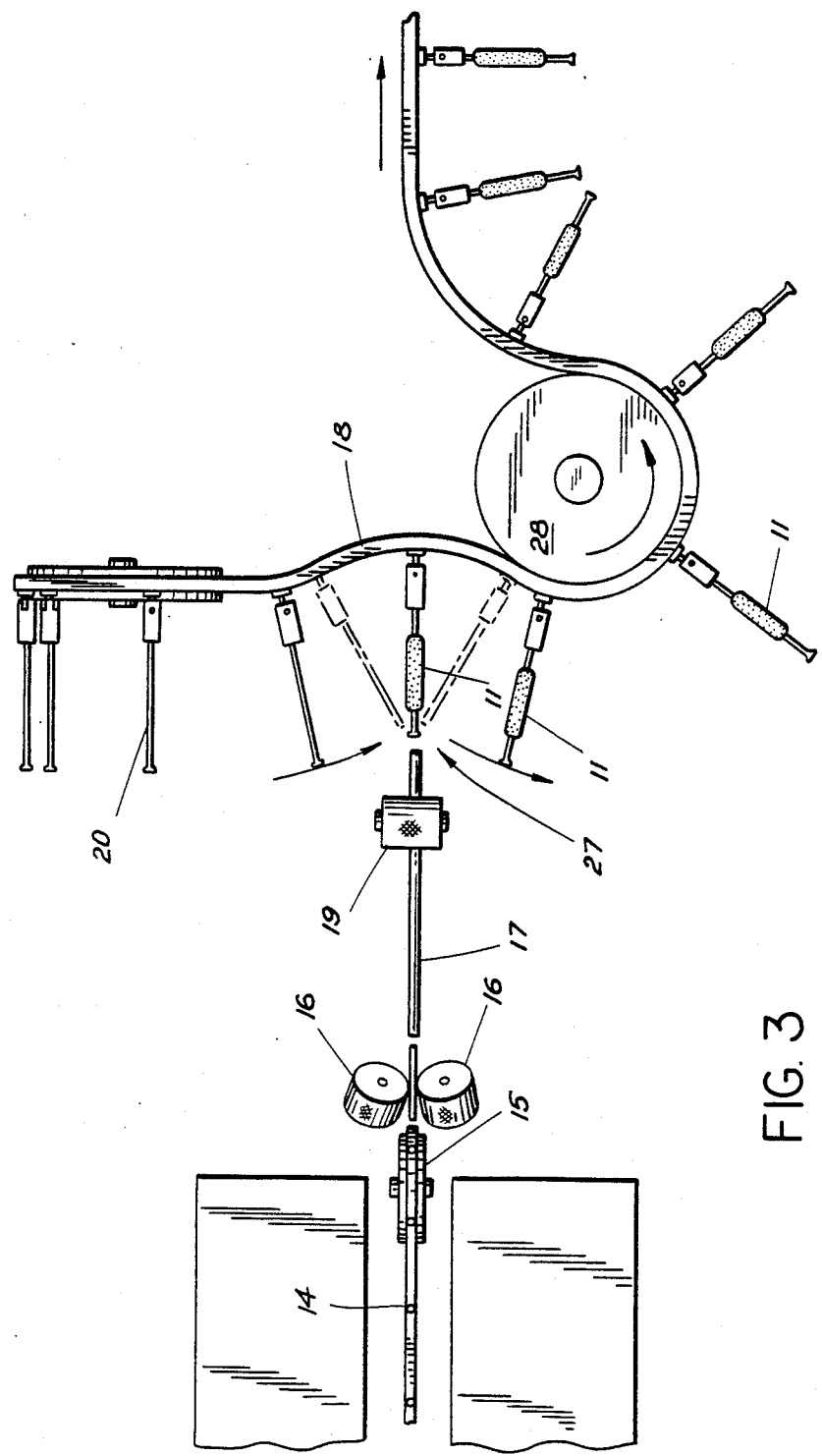
FIG. 3 is a schematic plan view of the portion of FIG. 2.
Figure 4:
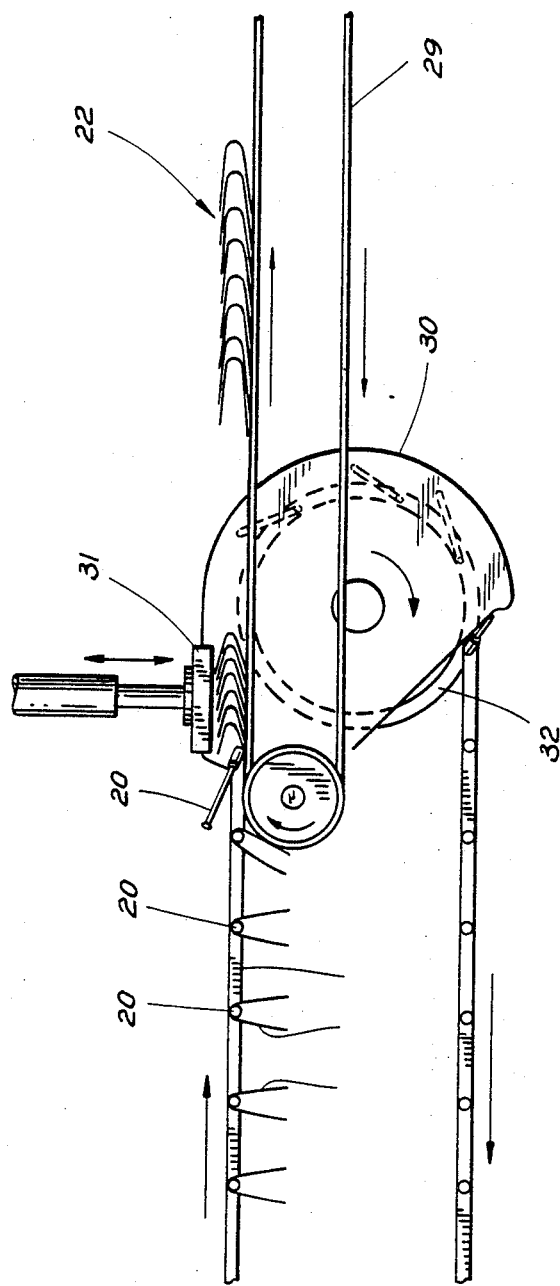
FIG. 4 is a schematic side elevation of a further portion of the machine of FIG. 1, wherefrom the "taco" shells are delivered for nesting and stacking.

Turning now to FIG. 3 wherein the method by which the shells 11 are delivered to the pins 20 is more fully depicted. The slide 17 delivers each shell 11 to a predetermined position 27. That position 27 acts as the centre from which the rods 20 radiate as the line 18 passes thereby.

Accordingly, as each rod moves into receiving alignment with the slide 17, it is effectively temporarily "stalled" to facilitate delivery of a shell thereto. Thereafter the line 18 passes round a roller 28. After a predetermined distance, the shells are deposited on a belt 29 by engagement of each pin with an abutment member 30. The shells 11 are then transported by the belt 29 until they are engaged by a product stabilising member 31. The product stabilising member 31 engages the shells so as to retain the first one stationary so that subsequent shells impact against the leading shell so as to be nested.

The abutment member 30 also provides a guide to retain the pins 20 in a position located adjacent the line 18 until they pass about the roller 32. The line 18 then returns to the predetermined position 27 via rollers 33 and 34.

The line 18 is coordinated with the line 13 in order for delivery of the shells 11 to the pins 20. Additionally the roller 19 would be adjustable in speed.

Figure 7:
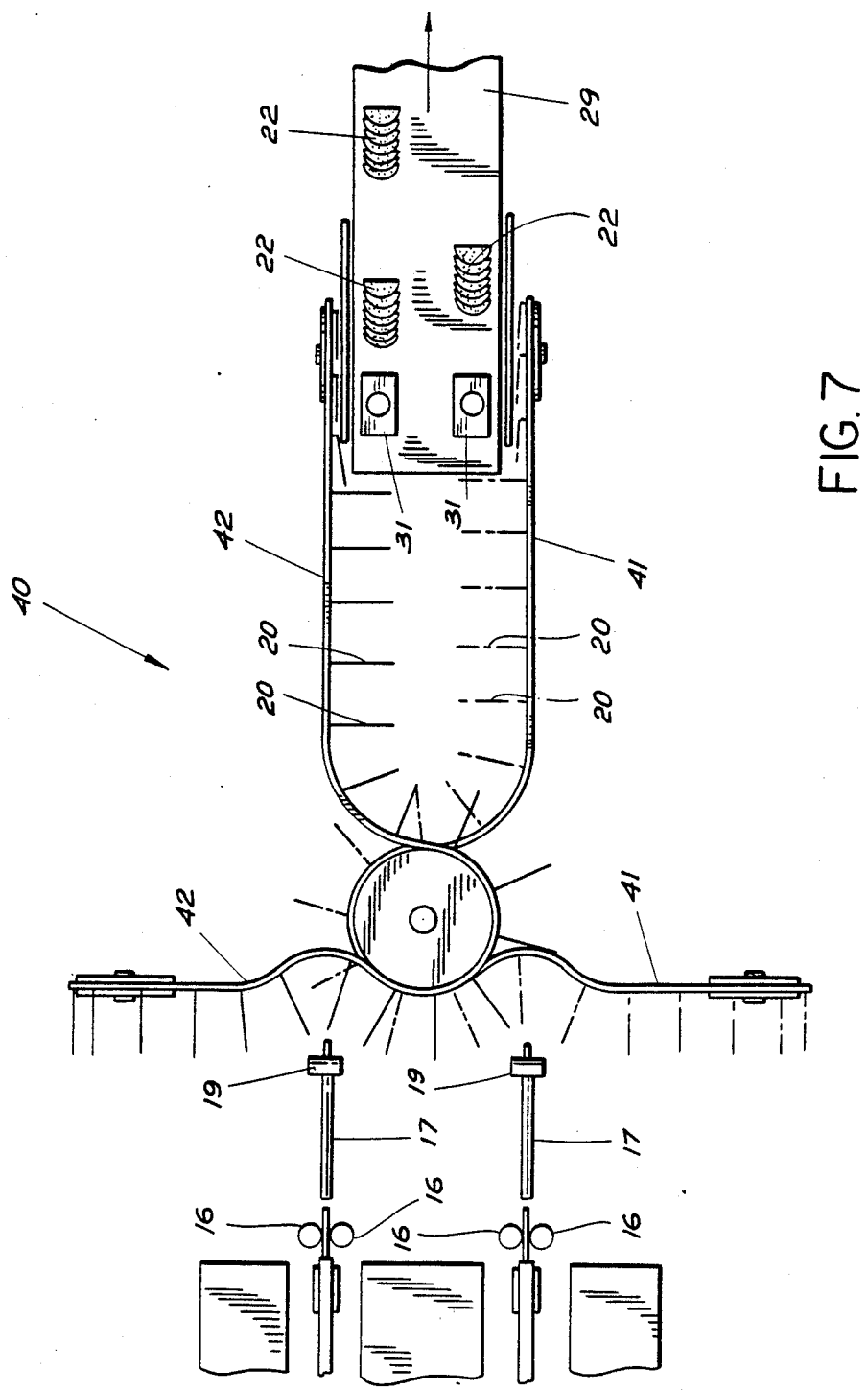
FIG. 7 is a schematic plan view of a dual assembly for the stacking and packaging of "taco" shells.

In FIG. 7 there is schematically depicted in plan view a dual assembly for the packaging of "taco" shells. The dual assembly 40 uses two slides 17 as previously discussed together with associated rollers 16 and 19. Two lines 41 and 42 are employed to deliver the "taco" shells to the belt 29. Preferably the line 41 would pass beneath the line 42 to thereby avoid interference between the pins 20 of the line 42, and the pins 20 of the line 41.

In the above-discussed preferred embodiments, the number of shells 11 located in each of the sets 22 is governed by vertical reciprocation of the stabilising member 31. The stabilising member 31 retains the shells 11 from movement with the belt 29 until a predetermined number of shells is collected. Thereafter the member 31 is raised to allow the collected shells to pass with the belt 29.

What we claim is:

1. A machine to aid in the packaging of a hollow food product, said machine comprising:

a first conveyor means to receive each product delivered thereto, and to position each product in a predetermined orientation, at a predetermined location;

a second conveyor means to receive each product from said first conveyor means at said predetermined location, said second conveyor means being adapted to deliver each product to a second predetermined position whereat the products are collected;

said first conveyor means including a slide extending downwardly to said predetermined location which passes through each product so that each product is retained in said predetermined orientation as it is moved along said slide to be delivered to said predetermined position;

said second conveyor means including an endless conveyor line restrained so as to pass along a predetermined path, and a plurality of pins attached at spaced locations to said line so as to extend outwardly therefrom, and wherein said predetermined path has an arcuate portion with its centre at or about said predetermined position so that as said pins pass thereabout the extremities thereof are located adjacent said predetermined position to facilitate transfer of the food products from said first conveyor means to said pins by successive alignment of the pins with the slide.

2. The machine of claim 1 further including a third conveyor means, which third conveyor means consists of an endless conveyor line to which there are attached product support means at spaced locations there along and upon which said products are mounted, and wherein said third conveyor means positions said product support means adjacent the beginning of said slide to facilitate transfer of the products from said support means to said slide.

3. The machine of claim 2 further including brush means located adjacent the beginning of said slide, and positioned to engage the products on said support means to transfer the products therefrom to said slide.

4. The machine of claim 1 wherein the pins are pivotally attached to the conveyor line so as to be movable between a portion generally normal to the line and a portion wherein the extremity of the pins is closer to the line, and said machine further includes means to receive the products from the pins at said second predetermined position and means to bias said pins away from said means to receive by deflection of the pins towards the line.

* * * * *